United States Patent [19]

Sawabe et al.

[11] Patent Number: 4,908,648
[45] Date of Patent: Mar. 13, 1990

[54] DISTANCE MEASURING DEVICE FOR AUTOMATIC FOCUSING CAMERA

[75] Inventors: Kosaku Sawabe, Ichikawa; Takashi Hongoh, Kawasaki, both of Japan

[73] Assignee: Ricoh Company, Ltd., Tokyo, Japan

[21] Appl. No.: 289,019

[22] Filed: Dec. 23, 1988

[30] Foreign Application Priority Data

| Dec. 30, 1987 | [JP] | Japan | 62-333804 |
| Jan. 22, 1988 | [JP] | Japan | 63-10782 |
| Jan. 22, 1988 | [JP] | Japan | 63-10783 |
| Jan. 27, 1988 | [JP] | Japan | 63-14680 |
| Oct. 19, 1988 | [JP] | Japan | 63-261629 |

[51] Int. Cl.$^4$ .................................. G03B 3/00
[52] U.S. Cl. ........................... 354/403; 354/409
[58] Field of Search .......................... 354/403, 409

[56] References Cited

U.S. PATENT DOCUMENTS

| 4,591,257 | 5/1986 | Sawano | 354/403 |
| 4,688,919 | 8/1987 | Ogawa et al. | 354/403 |
| 4,710,011 | 12/1987 | Ushiro | 354/403 |
| 4,720,724 | 1/1988 | Yokoo | 354/403 |
| 4,740,806 | 4/1988 | Takehana | 354/403 |
| 4,827,302 | 5/1989 | Takahashi | 354/403 |

*Primary Examiner*—Russell E. Adams
*Attorney, Agent, or Firm*—Oblon, Spivak, McClelland, Maier & Neustadt

[57] ABSTRACT

A distance measuring device for an automatic focusing camera which is automatically focused on an object in accordance with information data of distance to the object from the camera. The information data is obtained by irradiating a light emitted from a light emitting element to the object and receiving the light reflected from the object by an optical sensor. The optical sensor detects an incident point of the reflection light. The device comprises: a first light emitting element; an optical sensor; a second light emitting element; a light emission control circuit for controlling sequence of light emission from the first and second light emitting elements; a distance calculation circuit for calculating the information data of distance on the basis of an output from the optical sensor; a discrimination circuit for discriminating the information data; and a finder having an area mark for defining a field range. A first area in the finder defines a range of measurable distance by using only the first light emitting element. A second area defines a range of measurable distance by using only the second light emitting element. The longest distance side of the first area and the shortest distance side of the second area are overlapped each other in the finder.

7 Claims, 14 Drawing Sheets

DISTANCE MEASURING DEVICE FOR AUTOMATIC FOCUSING CAMERA

BACKGROUND OF THE INVENTION

The present invention relates to a distance measuring device for an automatic focusing camera. More particularly, the invention relates to a distance measuring device for an automatic focusing camera which automatically arranges the lenses thereof into an in focus position in accordance with information data of distance from the camera to an object to be taken as a photograph which data is obtained by emitting a detection beam from a light emitting diode (LED) to the object and detecting an incident point of the light reflected from the object on a light receiving element arranged within the camera. Further, the present invention may advantageously be applied to an automatic focusing camera provided with an alarm device which alarms when the distance to the object is too short to focus the lenses thereof on the object on the basis of the information data of the distance to the object.

Conventionally, a triangulation distance measuring method is known as a means for measuring the distance from the camera to the object. The known distance measurng means comprises an LED which emits a detection light toward the object and a light receiving element which is disposed at a position separated away from the LED by a predetermined reference length so as to receive the light reflected from the object. Such a distance measuring method is utilized for obtaining distance information data for driving an automatic focus adjusting means of the lenses of an automatic focusing camera which is called an AF camera and operates to automatically bring the lenses to an in focus position in accordance with the AF function thereof. Various kind of AF cameras have been developed and widely used.

The conventional AF camera comprises a finder display having an area mark provided thereon for defining an area in which the distance to the object can be measured by the AF function thereof.

Also, as another conventional camera, Japanese Unexamined Pat. Publication No. 60-140306 discloses a wide field camera which makes it possibly to widen the field of the lens of the camera by arranging a plurality of LEDs which are driven to emit light in a predetermined time sequence.

Also, another wide field AF camera which comprises a plurality of LEDs to widen the field of the lens of the camera is disclosed in Japanese Unexamined Pat. Publications Nos. 60-147709, 60-144711 and 60-168111.

Also, Japanese Unexamined Pat. Publication No. 59-198410 discloses an automatic focal length detection device which comprises one LED and two optical systems which have a different optical characteristic with respect to each other for the LED and which is arranged so that the system to be used is changed mechanically in accordance with the distance to the object.

However, in accordance with the above mentioned conventional AF cameras, there is a case in which the distance is mistakenly measured or impossible to measure when the object is positioned at a certain distance from the lens.

In order to solve this problem, the above mentioned arrangement which comprises one LED and two changeable optical systems is proposed in the Japanese Unexamined Pat. Publication No. 59-198410 mentioned above. However, the mechanical means for changing the optical system can not accurately positions the lenses at a predetermined position at the time of changing the system because of mechanically movable members to be driven, which degrades the reliability of measurement and increases the producing cost due to the increase of the number of components to be assembled.

Besides, the above mentioned patent publications do not disclose a technical solution to enlarge the range of measurable distance to the object from the camera.

SUMMARY OF THE INVENTION

The present invention was made considering the above mentioned drawbacks of the conventional AF cameras. It is therefore a first object of the present invention to provide a distance measuring device for an automatic focusing camera which makes it possible to avoid malfunction of the measuring device by minimizing the visual difference between the object appeared in the area mark in the finder and the actual object to which the light emitted from a first LED is irradiated which visual difference is caused by a spatial gap between the first LED and the finder.

Also, a second object of the present invention is to provide a distance measuring device for an automatic focusing camera which makes it possible to reduce the producing cost thereof and widen the range of measurable distance from the camera to the object in a normal focusing mode as well as in a short focal length mode wherein the object is positioned in the vicinity of the camera.

Also, a third object of the present invention is to provide a distance measuring device for an automatic focusing camera which makes it possible to measure the distance to the object which is positioned very close to the lens of the camera and therefore can be applied to a camera having a macro photographing function with minimized errors of measurement.

The first object of the invention can be achieved by a distance measuring device for an automatic focusing camera which is automatically focused on an object in accordance with information data of distance to the object from the camera which information data is obtained by irradiating a light emitted from a light emitting element to the object and receiving the light reflected from the object by a light receiving means so as to detect an incident point of the light onto the light receiving means, wherein the distance measuring device comprises: a first light emitting element disposed on an optical axis of a light emitting optical system; a light receiving means disposed at a point perpendicularly away from the optical axis by a predetermined reference length; a second light emitting element disposed at a point perpendicularly away from the optical axis on a side opposite to the light receiving means with respect to the first light emitting element; a light emission control means for controlling sequence of light emission from the first light emitting element and the second light emitting element; a distance calculation means for calculating the information data of distance on the basis of an output from the light receiving means corresponding to the incident position of the light to the light receiving element; a first memory means and a second memory means for memorizing a first information data with regard to the first light emitting element and a second information data with regard to the second light emitting element, respectively, calculated by the distance calculation means in the same sequence as the predetermined light emission sequence; a distance information data discrimination means for discriminating the information data from the first memory means and the second memory means so that, when the second information data is larger than a predetermined reference value, the second information data is determined to be effective, whereas when the second information data is smaller than the reference value, the first information data is determined to be effective; and a finder having a distance measuring area mark disposed at a position perpendicularly away from the optical axis by a predetermined length so as to define a range of field distance of which can be measured, wherein a first area and a second area are arranged in the finder in which the first area defines a range of measurable distance by using only the first light emitting element from the longest distance to the shortest distance to the object and the second area defines a range of measurable distance by using only the second light emitting element from the longest distance to the shortest distance to the object and wherein the longest distance side of the first area and the shortest distance side of the second area are overlapped each other in the finder.

The second object of the present invention can be achieved by a distance measuring device for an automatic focusing camera which is automatically focused on an object in accordance with information data of distance to the object from the camera which information data is obtained by irradiating a light emitted from a light emitting element to the object and receiving the light reflected from the object by a light receiving means so as to detect an incident point of the light onto the light receiving means and which camera alarms when the object is positioned within a short distance alarm range in which the object can not reliably be focused in accordance with the information data of distance to the object, wherein the distance measuring device comprises: a first light emitting element disposed on an optical axis of a light emitting optical system; a light receiving means disposed at a point perpendicularly away from the optical axis by a predetermined reference length; a second light emitting element disposed at a point perpendicularly away from the optical axis on a side opposite to the light receiving means with respect to the first light emitting element; a light emission control means for controlling the first light emitting element and the second light emitting element so that the first and the second light emitting elements are simultaneously driven to emit light in the state wherein luminous amount of the second light emitting element is smaller than that of the first light emitting element; a distance calculation means for calculating the information data of distance on the basis of an output from the light receiving means in accordance with an incident position of the light onto the light receiving means; and a distance information data discrimination means which compares the distance information data from the distance calculation means with a predetermined reference value and determines whether the photographing distance to the object is within the short distance alarm range or not, wherein the short distance alarm range is widened as possible to avoid measurement errors.

Further, the third object of the present invention can be achieved by a distance measuring device for an automatic focusing camera which is automatically focused on an object in accordance with information data of distance to the object from the camera which information data is obtained by irradiating a light emitted from a light emitting element to the object and receiving the light reflected from the object by a light receiving means so as to detect an incident point of the light onto the light receiving means, wherein the distance measuring device comprises: a light emitting side lens disposed on an optical axis of a light emitting optical system; a first light emitting element disposed on the optical axis behind the lens; a light receiving means disposed at a position perpendicularly away from the optical axis by a predetermined reference length; and a second light emitting element disposed at a position perpendicularly away from the optical axis in a side opposite to the light receiving means with respect to the first light emitting element, wherein a condition $0<(x/f)<0.1$ is satisfied in which the reference letter f is a distance (mm) from the light emitting side lens to the first light emitting element and the reference letter x is gap distance (mm) between the first light emitting element and the second light emitting element.

The first mentioned structure of the distance measuring device for an automatic focusing camera in accordance with the present invention is arranged in a manner that the longest distance side of the first area is superposed on the shortest distance side of the second area which makes it possible to make the area mark small due to the superposed portion and image the object in the area mark without generating parallax irrespective of the distance to the object.

Also, the second mentioned structure of the distance measuring device for an automatic focusing camera in accordnace with the present invention is arranged in a manner that the luminous amount of the second light emitting element is reduced and the first light emitting element and the second light emitting element emit the light simultaneously with each other so that the light from the first light emitting element and the light from the second light emitting element are spatially compounded together thus compounding the distance information data which makes it possible to enlarge the short distance alarm range and reduce the producing cost due to the simplified structure due to the simultaneous light emission arrangement.

Further, the third mentioned structure of the distance measuring device for an automatic focusing camera in accordance with the present invention is arranged in a manner that the light emitting side lens, the first light emitting element and the second light emitting element are arranged to satisfy the condition $0<(x/f)<0.1$ mentioned above and that the object positioned at a long distance away from the camera is measured mainly by the first light emitting element whereas the object positioned in the vicinity of the camera is measured mainly by the second light emitting element, which makes it possible to apply the distance measuring device to a camera having a macro photographing function and measure the distance to the object with a necessitated accuracy without reducing the reliability of measurement of the object at a position long distance away from the camera.

Advantages of the above mentioned distance measuring device for an automatic focusing camera in accordance with the present invention are as follows.

With regard to the construction of the distance measuring device mentioned first, the parallax due to the positional arrangement of the first light emitting element in relation to the finder can be removed, which makes it possible to measure the distance of the object appeared in the short distance side in the area mark and avoid measurement errors, which has not been achieved in accordance with the prior art structure. This advantage is obtained due to the arrangement in which a first area and a second area are arranged in the finder in which the first area defines a range of measurable distance by using only the first light emitting element from the longest distance to the shortest distance to the object and the second area defines a range of measurable distance by using only the second light emitting element from the longest distance to the shortest distance to the object and wherein the longest distance side of the first area and the shortest distance side of the second area are superposed in the finder.

With regard to the construction of the distance measuring device mentioned second, it becomes possible to enlarge the range wherein the distance to the object can be measured and also enlarge the short distance alarm range so that measurement errors can be avoided and that a compact structure can be obtained at a low cost in comparison to the first mentioned structure of the present invention. The above mentioned advantages of the second mentioned structure are obtained due to the arrangement in which a light emission control means controls the first light emitting element and the second light emitting element so that the first and the second light emitting elements are simultaneously driven to emit light in the state wherein luminous amount of the second light emitting element is smaller than that of the first light emitting element in which a distance calculation means calculates the information data of distance on the basis of an output from the light receiving means in accordance with an incident position of the light onto the light receiving means and in which a distance information data discrimination means compares the distance information data from the distance calculation means with a predetermined reference value and determines whether the photographing distance to the object is within the short distance alarm range or not.

Also, with regard to the construction of the distance measuring device mentioned third, the structure thereof becomes compact so that the producing cost can be reduced and it becomes possible to measure the distance of the object positioned close to the camera therefore enabling to apply the device to a camera having a macro photographing function without measuring errors. The above mentioned advantages of the third mentioned structure are obtained due to the arrangement in which a light emitting side lens is disposed on an axis of a light emitting optical system, in which a first light emitting element is disposed on the optical axis at a position f (mm) behind the lens, in which a second light emitting element is disposed at a position perpendicularly away from the optical axis in a side opposite to the light receiving means and separated from the first light emitting element by a gap length of x (mm), and in which a condition of $0 < (x/f) < 0.1$ is satisfied.

Further objects and advantages of the present invention will be apparent from the following description of the preferred embodiments of the invention as illustrated in the accompanying drawings.

DESCRIPTION OF THE PREFERRED EMBODIMENTS

The present invention is further described in detail referring to and in comparison to the related art thereof.

Figure 1:
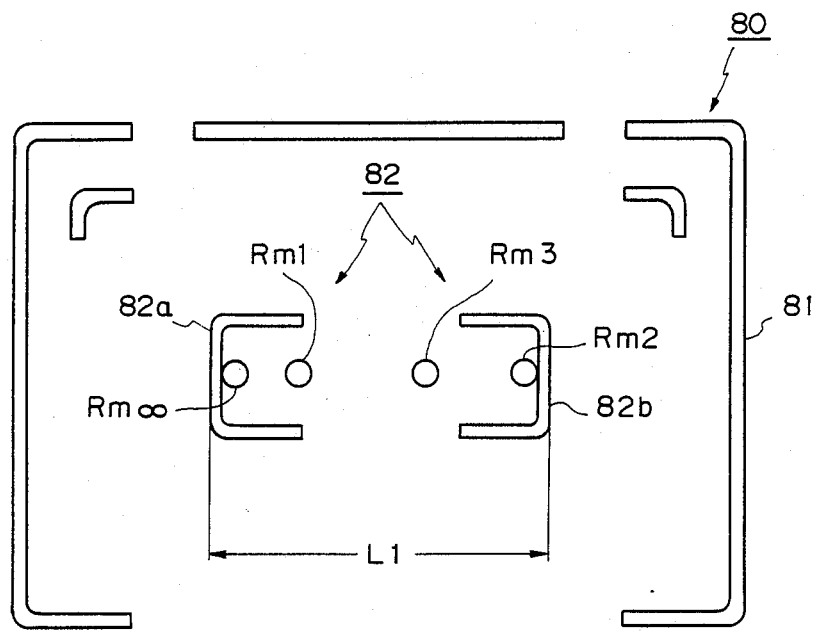
FIG. 1 is an explanatory view for explaining relationship between the area mark appeared in the finder display and the range in which the distance to the object can be measured.

FIG. 1 illustrates a finder display of an AF camera relating to the present invention. This AF camera comprises a finder display 80 in which a field mark 81 for defining a photographing field and an area mark 82 for defining a field range in which the distance to an object can be measured are displayed. The area mark 82 is composed of a pair of image frames 82a and 82b facing with each other and arranged within the field mark 81. The AF camera automatically measures the distance from the camera to an object appeared in the area mark 82 in accordance with an AF function thereof.

Figure 2:
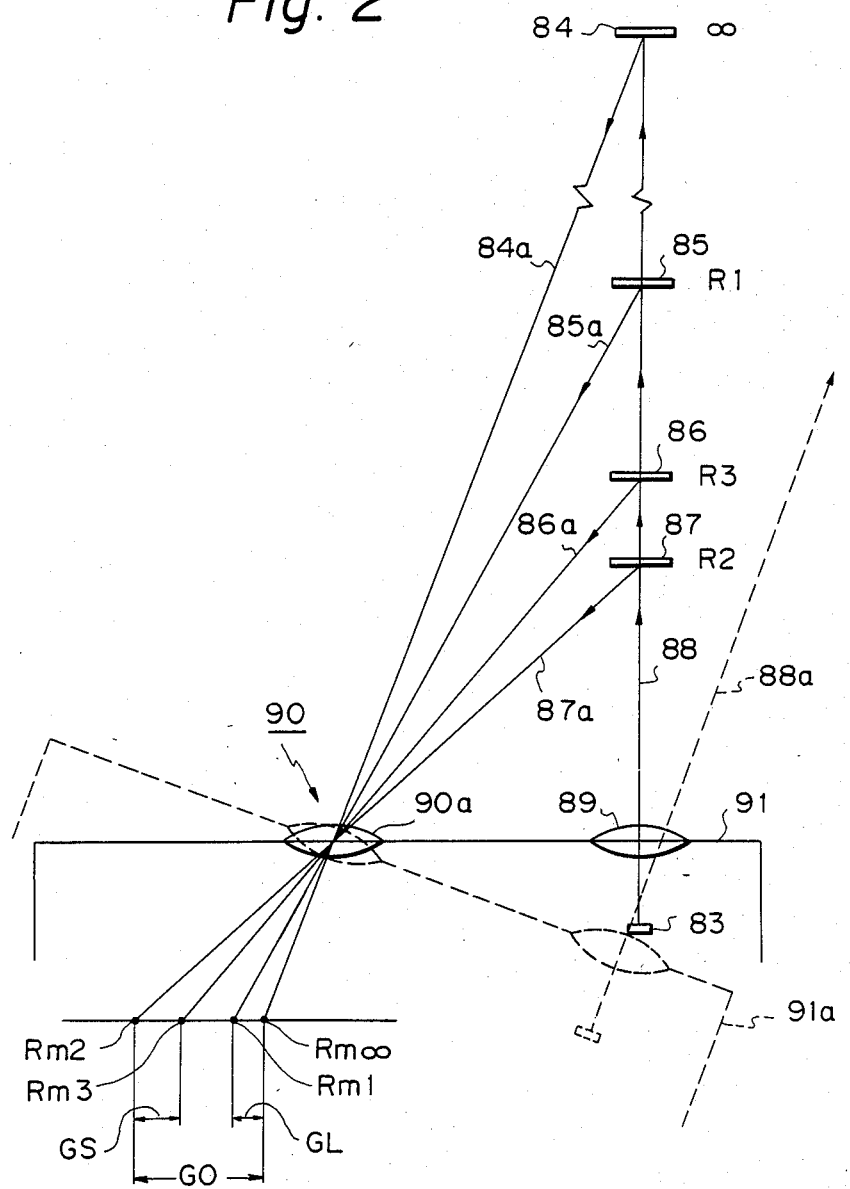
FIG. 2 is an explanatory view for explaining each area in the finder corresponding to the distance measurable range between the longest distance to the object and the shortest distance to the object by using a center chip and a side chip.

However, the AF camera of FIG. 1 comprises only one LED for emitting detection light to the object which is positioned at any distance from the camera. As shown in FIG. 2, the camera comprises an LED 83 which is used for measuring the distance of the object irrespective of the distance thereof from the camera from a position at infinity ∞ to a position R2 in the vicinity of the camera. Reference numerals 84 to 87 designates objects each of which is positioned at a different position from ∞ to R2 as illustrated in FIG. 2. Each object reflects the incident beam from the LED and reflects the beam to the camera. Each of reflection beams 84a to 87a passes through an object lens 90a of the finder 90 and forms an image at a position Rm∞, Rm1, Rm2 or Rm3 in an image area G0, according to the distance to the object. However, with this structure, the image area becomes wide due to the wide coverage of the distance to the object so that the width L1 of the area mark 82 (FIG. 1) in the finder must be enlarged to cover the image positions from Rm∞ to Rm2, as illustrated in FIG. 1.

Note that in FIG. 2, the finder 90 is illustrated by only one convex lens for the sake of easy understanding of the principle of the structure. However, actually in general, an object lens comprises a concave lens and an ocular lens comprises a convex lens. Therefore, the image positions Rm∞ to Rm2 are reversed with respect to the order in the direction from the right to the left, as illustrated in FIG. 1.

With the above mentioned structure comprising the area mark 82 having a wide width L1, there may be a case in which a measurement error occurs as described below. In FIG. 2, for example, an object 85 which positions at R1 is to be taken, the distance measuring device of the camera functions correctly when the direction of the camera body 91 is arranged so that the object 85 appears at the image position Rm1 in the area mark 82. However, if the object 85 is to be imaged at the position Rm2 in the area mark 82 for the reason of, for example, picture composition, the direction of the camera body 91 must be changed so that the camera is arranged as shown by dash lines 91a. In this case, the distance detection beam 88 is directed to the direction depicted by a dash line 88a rather than toward the object 85. Therefore, the distance measuring device measures the distance far longer than that of the object 85. Such a measuring error is caused by parallax between the finder 90 (the area mark 82 more specifically) and the distance detection beam 88a due to the arrangement of the finder 90 separated away from the detection beam 88.

Figure 3:
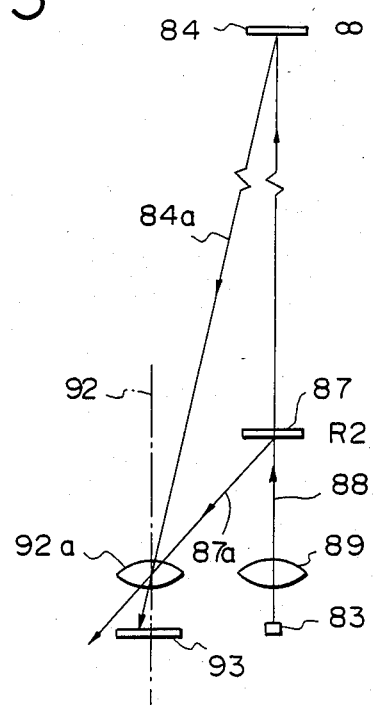
FIG. 3 is an explanatory view for explaining relationship between the distance to the object and the incident position of the reflection light to the PSD.

The above mentioned triangulation distance measuring method is further described with reference to FIG. 3. The distance to the object has a relation to the incident position of the reflection beam to the light receiving element as illustrated in FIG. 3 in which reflection beams 84a and 87a and a PSD (Position Sensitive Detector) 93 as the light receiving element are illustrated. As can be seen from the drawing, the reflection beam 84a reflected from the object 84 positioned at the infinity (∞) irradiates the PSD at a position in the closest vicinity of the axis 92 thereof (actually at a position coinciding with the axis 92). On the other hand, the reflection beam 87a reflected from the object 87 positioned near the camera irradiates the PSD placed plane at a position remote from the optical axis 92 so that the incident reflection beam 87a can not be received by the PSD 93 as illustrated in FIG. 3, thus the distance of the object 87 can not be measured.

Also, in accordance with the structure mentioned above, there is a problem that the left end of the PSD 93 in the drawing can not be used as described below.

Figure 4:
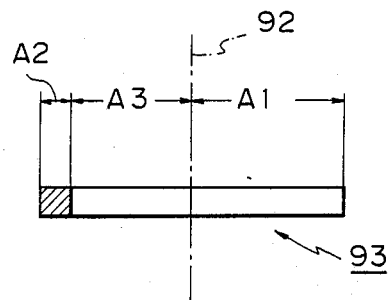
FIG. 4 is an explanatory view for explaining the light receiving area of the PSD.
Figure 5:
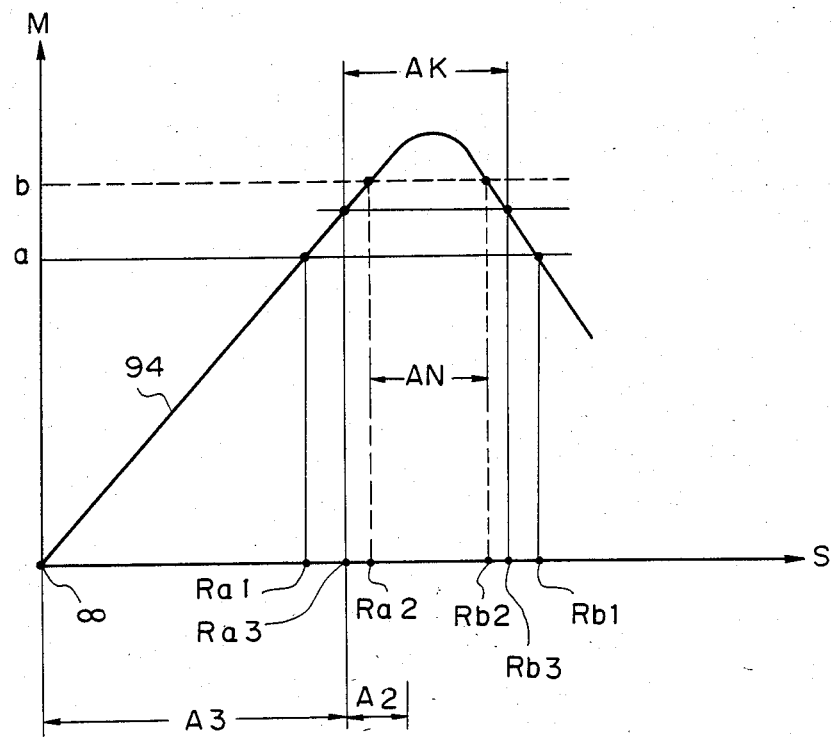
FIG. 5 is a graphical view of a distance measuring characteristic for explaining the function of the control means and the data discrimination means of the camera of the related art of the present invention.

In general, the PSD 93 is disposed symmetrically with respect to the optical axis 92 thereof as illustrated in FIG. 4. The right half side area A1 of the PSD 93 is not used for measuring the distance. The PSD 93 functions to measure the distance by using the light receiving areas A2 and A3 in the left half side of the PSD 93. The incident reflection spot beam does not irradiate the PSD at a point but has an area to be irradiated. Therefore, in the vicinity of the light receiving area A2 at the end of the PSD 93, the spot area of the incident beam onto the area A2 decreases according as the spot beam shifts in the direction away from the optical axis 92 and vanishes at last. This is explained further with reference to FIG. 5 illustrating a graph of distance measuring characteristic of the PSD in which the ordinate M represents the calculation result in response to the output from the PSD 93 and the abscissa S represents the reciprocal of the distance to the object for the sake of easy graphing. The characteristic curve line 94 has an approximately symmetrical convex shape having a peak at the center thereof and descending to M=0 at the position of the infinity ∞. Therefore, one calculation result on the ordinate, for example, M=b corresponds to two points on the abscissa i.e., Ra2 and Rb2, respectively, one being a genuine value and the other being a ghost value. Therefore, it is necessary to discriminate the genuine value which corresponds to the distance to the object from the ghost value. However, it is hard to determine the genuine value when the two points are close together. For example, on the condition that M=b corresponds to Ra2=55 cm and Rb2=45 cm, whereas M=a corresponds to Ra1=70 cm and Rb1=30 cm, an ordinary person can visually discriminate the distance difference between Ra1=70 cm and Rb1=30 cm, but can not discriminate the distance difference between Ra2=55 cm and Rb2=45 cm. Therefore, the problem of generation of the ghost can be removed by the user when the difference between the genuine value and the ghost value is larger than a predetermined value, through the problem can not be solved when the difference between the genuine value and the ghost value is small. Therefore, in order to solve the problem of the ghost, a short distance alarm range AK is arranged between an indiscriminable range AN which spans from the point Ra2 to the point Rb2 and a discriminable range which spans from the point Ra1 to the point Rb1, so that the measurement of the distance is prohibited when the object is positioned in the short distance alarm range AK by alarming the user that the AF mechanism of the camera does not correctly function when the distance to the object is between Ra3 and Rb3.

More specifically, to solve the problem of the ghost, the distance measuring device is arranged in a manner that a range of distance from the infinity to Ra3 is assigned to the light receiving area A3 of the PSD 93 illustrated in FIG. 4 as a distance measurable area, whereas a range of distance shorter than Ra3 (right side of Ra3 in FIG. 5) is assigned to the light receiving area A2 for alarming the short distance.

With the above mentioned arrangement, it becomes possible to avoid the problem of the ghost. However, the short distance side of the distance measurable area A3 of the PSD is narrowed by the short distance alarm area A2. Accordingly, the object at the position Ra3, Ra2, Rb2, Rb3 can not be detected.

In order to solve the problem, several techniques have been proposed in the patent application documents mentioned before. However, those prior art techniques are insufficient to fully solve the problem.

Figure 6:
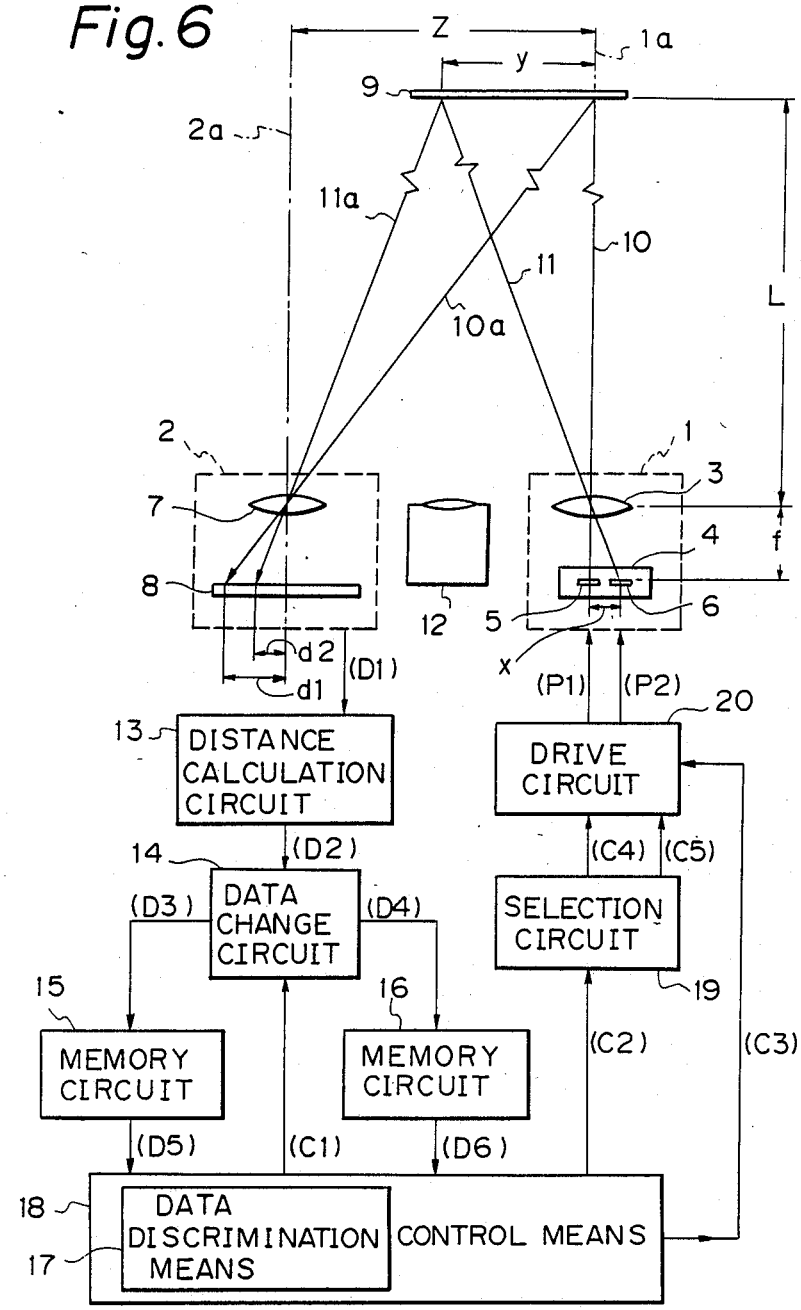
FIG. 6 is a block diagram for showing a whole structure of an embodiment of the automatic focusing camera in accordance with the present invention.

A first embodiment of the distance measuring device for an automatic focusing camera is illustrated in FIGS. 6 to 9. FIG. 6 is a block diagram of a whole structure of the first embodiment of the present invention.

The distance measuring device of FIG. 6 comprises: a light emitting system 1; an optical axis 1a of the light emitting system 1; a light receiving means 2 disposed at a position away from the optical axis 1a of the light emitting system 1 by a predetermined reference length Z in the direction substantially perpendicular to the optical axis 1a; an optical axis 2a of the light receiving means 2 arranged substantially in parallel with the optical axis 1a of the light emitting system; a light emitting side lens 3 disposed on the optical axis 1a of the light emitting system; a light emitting element 4 comprising, for example, a two-chip LED comprising a pair of light emitting chips sealed therein and disposed behind the light emitting side lens 3 a t aposition f (mm) away from the lens 3; a center chip 5 constituting one of the pair of light emitting chips of the LED and disposed on the optical axis 1a of the light emitting system 1; and a side chip 6 constituting the other of the pair of light emitting chips of the LED and disposed at a position away from the center chip 5 by x (mm) in the direction substantially perpendicular to the optical axis 1a of the light emitting system in a side opposite to the light receiving means with respect to the center chip 5. The light emitting side lens 3 and the light emitting element 4 constitute the light emitting system 1.

The first embodiment of the distance measuring device further comprises: a light receiving side lens 7 disposed on the optical axis 2a of the light receiving means 2; and an optical sensor 8 disposed on the optical axis 2a behind the light receiving side lens 7 in a manner that a light receiving area (not shown) thereof is arranged substantially perpendicular to the optical axis 2a. In this example, the optical sensor 8 comprises a PSD (Position Sensitive Device) disposed in a manner that the center of the light receiving area thereof positions on the optical axis 2a of the light receiving means 2. The light receiving side lens 7 and the optical sensor 8 constitute the light receiving means 2.

Also, in FIG. 6, reference numeral 9 designates an object to be photographed positioned at a position away from the camera by any desired distance and disposed substantially perpendicular to the optical axes 1a and 2a. Reference numerals 10 and 11 designate a center light beam and a side light beam emitted from the center chip 5 and the side chip 6, respectively. Reference nuemrals 10a and 11a designate reflection lights of the center light beam 10 and the side light beam 11 reflected from the object 9, respectively, and propagating toward the light receiving means 2. Reference numeral 12 designates a finder disposed at a position away from the optical axis 1a in the direction substantially perpendicular to the optical axis 1a by a predetermined length. The finder 12 comprises a distance measuring area mark as described later.

The above mentioned distance measuring device of the present invention further comprises: a distance calculation circuit 13 which calculates the distance to the object in accordance with an output (D1) from the light receiving means 2 and outputs the calculation result as a distance measurement data (D2); a data change circuit 14 having two outputs (D3) and (D4) one of which is selected in accordance with a data change signal (C1); a first memory circuit 15 for memorizing the output (D3) as a first distance information data; a second memory circuit 16 for memorizing the output (D4) as a second distance information data; and a data discrimination means 17 which compares distance measurement information data (D5) and (D6) received from the first memory circuit 15 and the second memory circuit 16, respectively, with a predetermined reference value as described later and determines an effective distance measurement information data from the above mentioned information data (D5) and (D6) in accordance with the result of the comparison of the information data with the reference value.

The above mentioned distance measuring device of the present invention further comprises: a control means 18 which includes the data discrimination means 17 and outputs the above mentioned data change signal (C1), a selection signal (C2) and a switching signal (C3); a selection circuit 19 which receives the selection signal (C2) and selects one of the center chip 5 and the side chip 6 of the light emitting element 4 so as to determine the sequence and timing of the light emission; and a drive circuit 20 which receives an execution signal (C4) from the selection circuit 19 in addition to the above mentioned switch signal (C3) and outputs drive signals (P1) and (P2) for driving the center chip 5 and the side chip 6, respectively. The drive circuit 20 and the selection circuit 19 constitute a light emission control means.

The present invention is further described below in detail with reference to the drawings wherein the same or corresponding parts are designated by the same reference numeral as that of FIG. 1. Note that an execution signal (C5) represented in FIG. 1 is useless in the first embodiment of the present invention.

Figure 7:
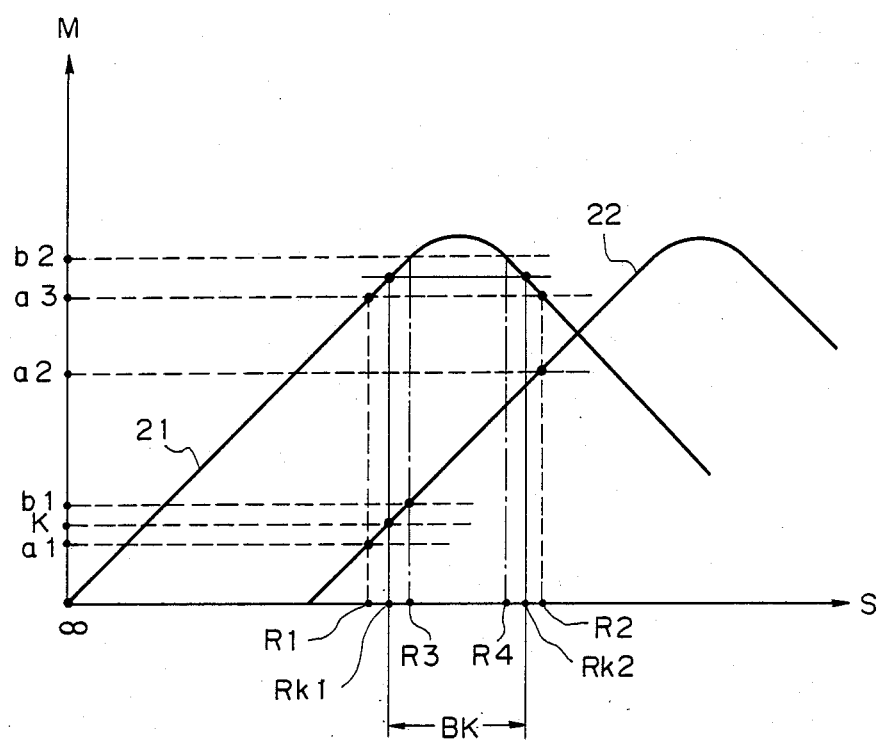
FIG. 7 is a graphical view of a distance measuring characteristic for explaining the function of the control means and the data discrimination means of the automatic focusing camera of FIG. 6.

FIG. 7 is a graphical view representing distance measurement characteristics of the control means 18 and the data discrimination means 17 of the above mentioned first embodiment of FIG. 6.

In FIG. 7, the ordinate M represents the calculation output corresponding to the distance measurement information data (D2) which is output from the distance calculation circuit 13 and the abscissa S represents the reciprocal of the distance to the object for the sake of easy representation of the characteristic in the graph. Therefore, with respect to the abscissa S, the intersection point with the ordinate M represents the distance at the infinity ∞ and the distance decreases toward the direction of the arrow of the abscissa S. In the graph of FIG. 7, a line 21 represents a distance measurement characteristic when only the center chip 5 is used and another line 22 represents a distance measurement characteristic when only the side chip 6 is used. The two lines 21 and 22 have a convex shape similar to each other. The line 22 is shifted toward the short distance side of the line 21. BK designates a range corresponding to the short distance alarm range AK mentioned before. The range BK spans from a point Rk1 to a point Rk2. The letter k represents a reference value. Each of references R1 to R4 designates the distance to the object in which R1 and R2 correspond to Ra1 and Rb1 of FIG. 5, respectively and R3 and R4 correspond to Ra2 and Rb2 of FIG. 5, respectively.

Figure 8:
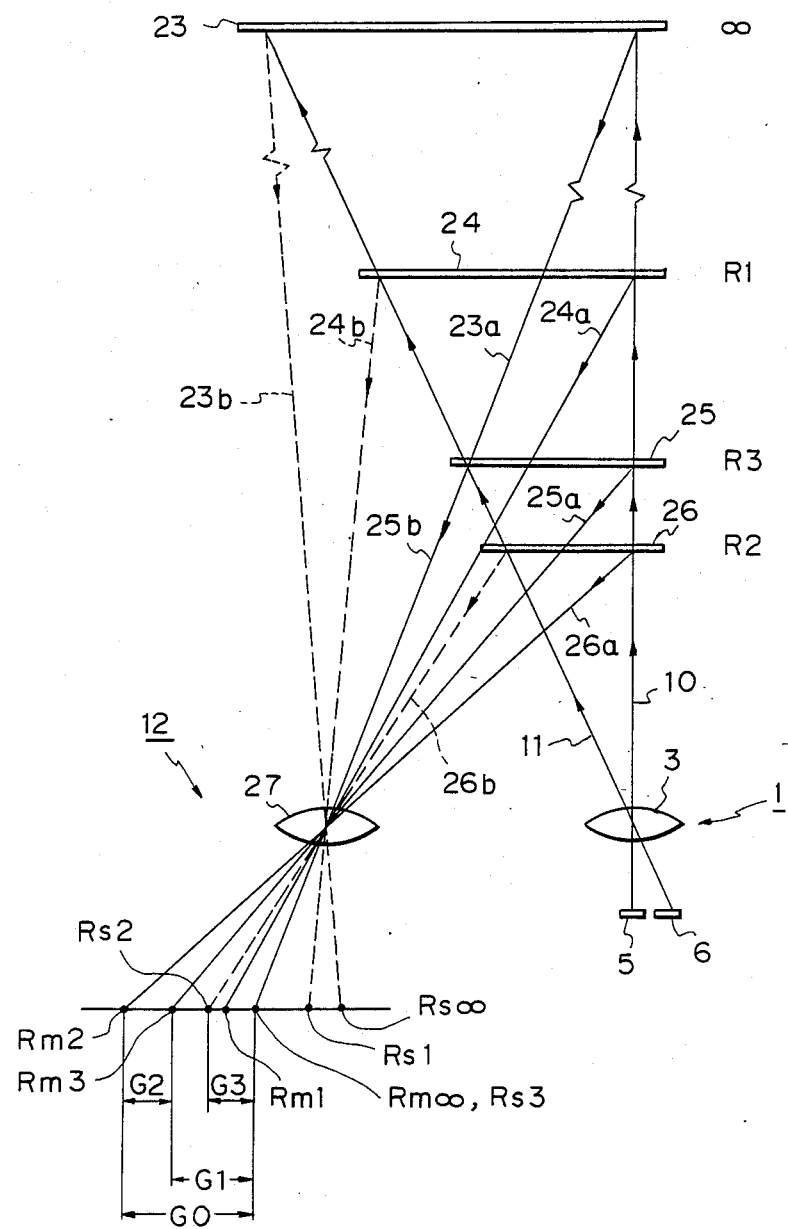
FIG. 8 is an explanatory view for explaining each area in the finder corresponding to the distance measurable range between the longest distance to the object and the shortest distance to the object by using a center chip and a side chip in accordance with the present invention.

FIG. 8 is an explanatory view for explaining each area in the finder 12 corresponding to the distance measurable range from the longest distance to the shortest distance to the object by means of the center chip 5 and the side chip 6.

In FIG. 8, each of reference numerals 23 to 26 designates an object which is disposed at each of positions designated by the infinity mark, R1, R3, and R4, corresponding to the distance to the object from the camera, respectively, and which object is substantially perpendicular to the optical axis of the light emitting system 1. Each of reference numerals 23a, 24a, 25a and 26a designates a center reflection light of the center light beam 10 reflected by each of the objects 23 to 26. Also, each of reference numerals 23b, 24b, 25b and 26b designates a side reflection light of the side light beam 11 reflected by each of the objects 23 to 26.

Reference numeral 27 designates an object lens of the finder 12. Each of reference letters Rm∞, Rm1, Rm3 and Rm2 designates an image position of each of the center reflection lights 23a to 26a, respectively, in the finder 12. Each of reference letters Rs∞, Rs1, Rs3 and Rs2 designates an image position of the side reflection light 23b to 26b, respectively, in the finder 12. Reference letter G0 designates a center area or a first area spanning between the image positions Rm∞ and Rm2 in the finder 12 which area corresponds to the distance measurable range between the object 23 positioned at the infinity measured by using only the center light beam 10 and the object 26 positioned at the position R2 representing the shortest distance to the object. Reference letter G1 designates an effective area described later in detail. Reference letters G2 and G3 designate a shortest distance side area and a infinity side area of the center area G0, respectively. Note that a side area spanning between the image positions Rs∞ and Rs2 corresponds to the second area. Also, the gap between the center chip 5 and the side chip 6 is so arranged that the center reflection light 23a and the side reflection light 25b substantially coincide with each other. That is, the infinity side area G3 of the center area G0 superposes on the shortest distance area spanning between the image positions Rs2 and Rs3 of the side area.

Also, in FIG. 8, the object lens 27 is represented only by a convex lens for the sake of easy understanding of the principle. However, in general, a reversed Galileo type finder is used as a range type finder in which the object lens comprises a concave lens and the ocular lens comprises a convex lens. Accordingly, the order of the images represented in the finder is reversed in the direction from the right to the left as illustrated in FIG. 9.

Figure 9:
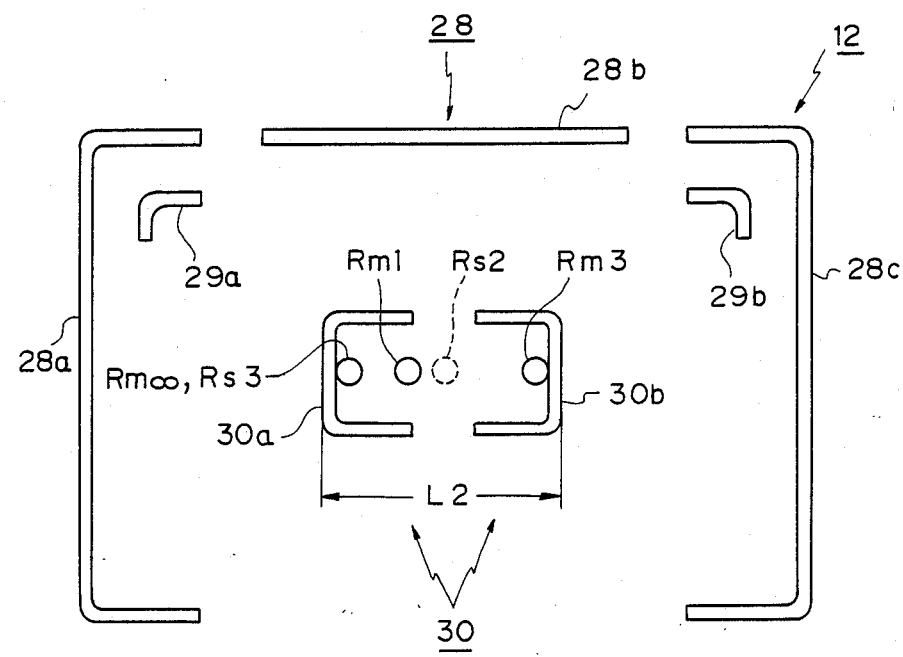
FIG. 9 is an explanatory view for explaining relationship between the area mark appeared in the finder display and the range in which the distance to the object can be measured.

FIG. 9 is a front view of the finder 12 for explaining relationship between the distance measuring area mark 30 and the image positions Rm∞ to Rm3 and Rs3 to Rs2.

The finder 12 illustrated in FIG. 9 comprises: a field mark 28 showing a field of photograph and comprising optical frames 28a, 28b and 28c arranged in a rectangular shape in the display of the finder 12; positioning marks 29a and 29b for compensating for parallax; and a distance measurement area mark 30 comprising a pair of U-shape optical frames 30a and 30b facing with each other. The image positions Rm∞, Rs3, Rm1 Rs2 and Rm3 mentioned before with reference to FIG. 8 are represented each in a circle within the area mark 30. Note that each of the optical frames 30a and 30b of the area mark 30 substantially coincides with each of the ends of the execution area G1.

Figure 10:
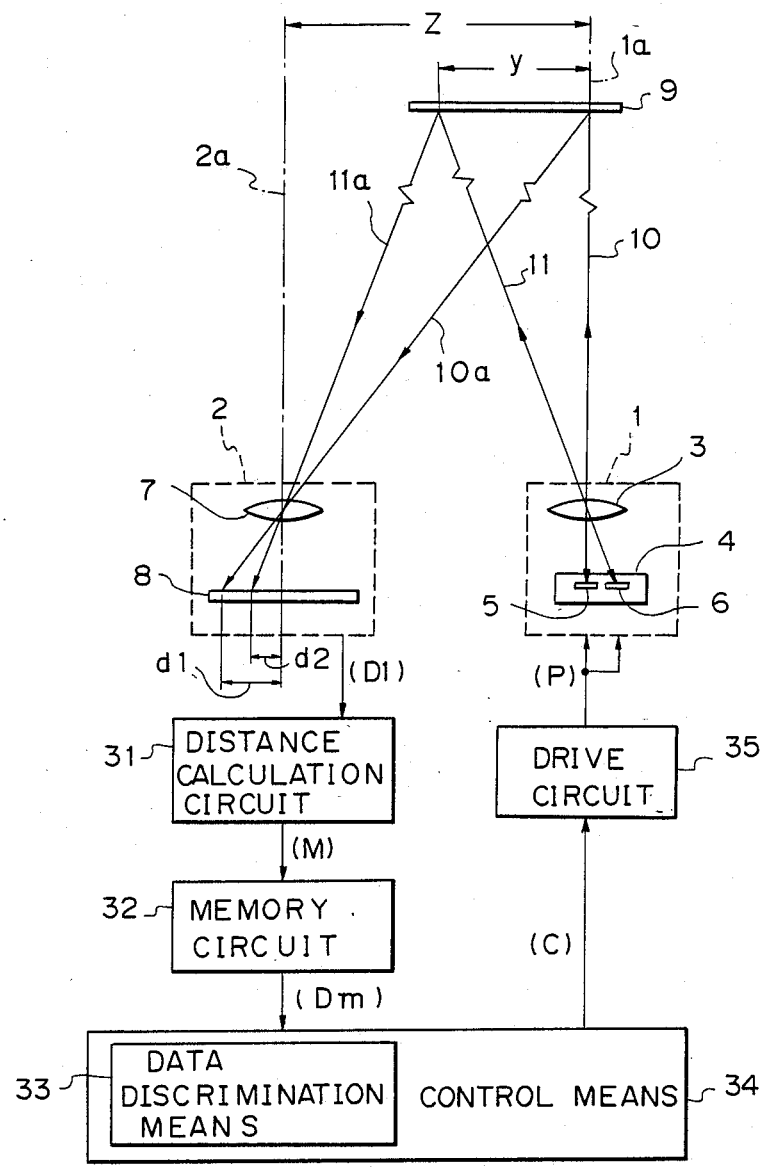
FIG. 10 is a block diagram of a whole structure of another embodiment of the present invention.

A second embodiment of the present invention is described hereinafter with reference to FIGS. 10 to 12. FIG. 10 is a block diagram of a whole structure of the second embodiment. The optical system of FIG. 10 is substantially the same as that of FIG. 6 except that the finder 12 of FIG. 6 is deleted in FIG. 10. Therefore, the same or corresponding parts (the light emitting system 1 to the reflection light 11a) are designated by the same reference numeral.

The second embodiment of the distance measuring device in accordance with the present invention illustrated in FIG. 10 comprises: a distance calculation circuit 31 which calculates the distance to the object as a distance information data on the basis of a position signal (D1) transmitted from the light receiving means 2 and outputs the calculation result as a distance measurement data (M); a memory circuit 32 which registers the above mentioned distance measurement data (M) and outputs this distance measurement data as another distance measurement data (Dm); a data discrimination means 33 which compares the distance measurement data (Dm) transmitted from the memory circuit 32 with a reference value (a) as described later in detail and determines whether the distance measurement data (Dm) is within the range to be alarmed or not; a control means 34 which includes the data discrimination means 33 and outputs a light emitting signal (C); and a drive circuit 35 which drives the center chip 5 and the side chip 6 of the light emitting element 4 simultaneously with each other in response to the light emitting signal (C) as described later in detail.

Figure 11:
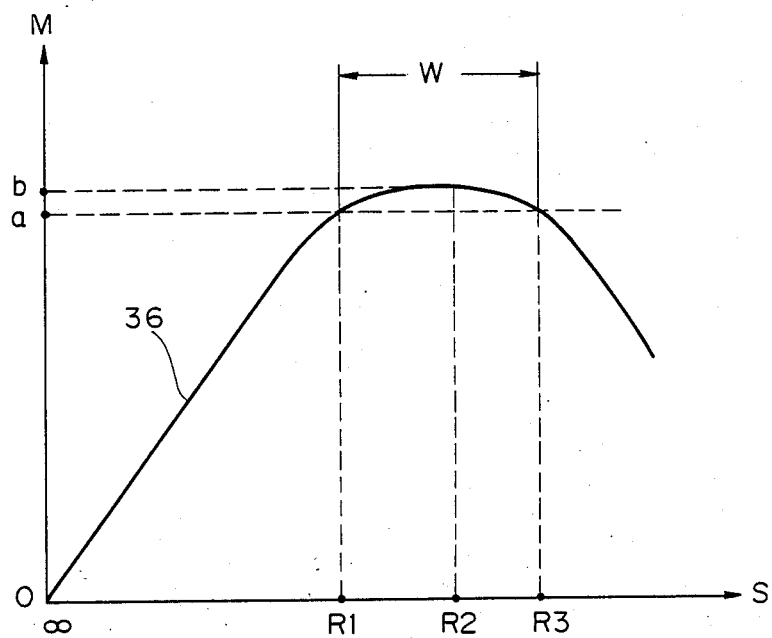
FIG. 11 is a graphical view for showing a distance measuring characteristic of the embodiment of FIG. 10.

FIG. 11 is a graphical view representing a distance measurement characteristic of the data discrimination means 33 of the above mentioned second embodiment of FIG. 10.

In FIG. 11, the ordinate M represents the value corresponding to the distance measurement information data (M) and the abscissa S represents the reciprocal of the distance to the object for the sake of easy representation of the characteristic in the graph. Therefore, with respect to the abscissa S, the intersection point with the ordinate M represents the distance at the infinity ∞ and the distance decreases toward the direction of the arrow of the abscissa S.

In FIG. 11, the line 36 represents a characteristic curve compounding the characteristic lines 21 and 22 together which lines are mentioned before with reference to FIG. 7. In other words, the line 36 represents a distance measurement characteristic curve when the center chip 5 and the side chip 6 are simultaneously driven to emit the light. In the graph, the above mentioned reference value is represented by a reference a in the ordinate and the peak value of the characteristic line 36 is represented by a reference b. Reference letter W represents a short distance alarm zone corresponding to the range BK mentioned before with reference to FIG. 7. Reference marks ∞, R1, and R3 represent the distance to the object. R2 which is referred to in the graph of FIG. 7 is also put on the graph of FIG. 11 for the sake of comparison though the reference R2 is not directly related to this embodiment.

Figure 12:
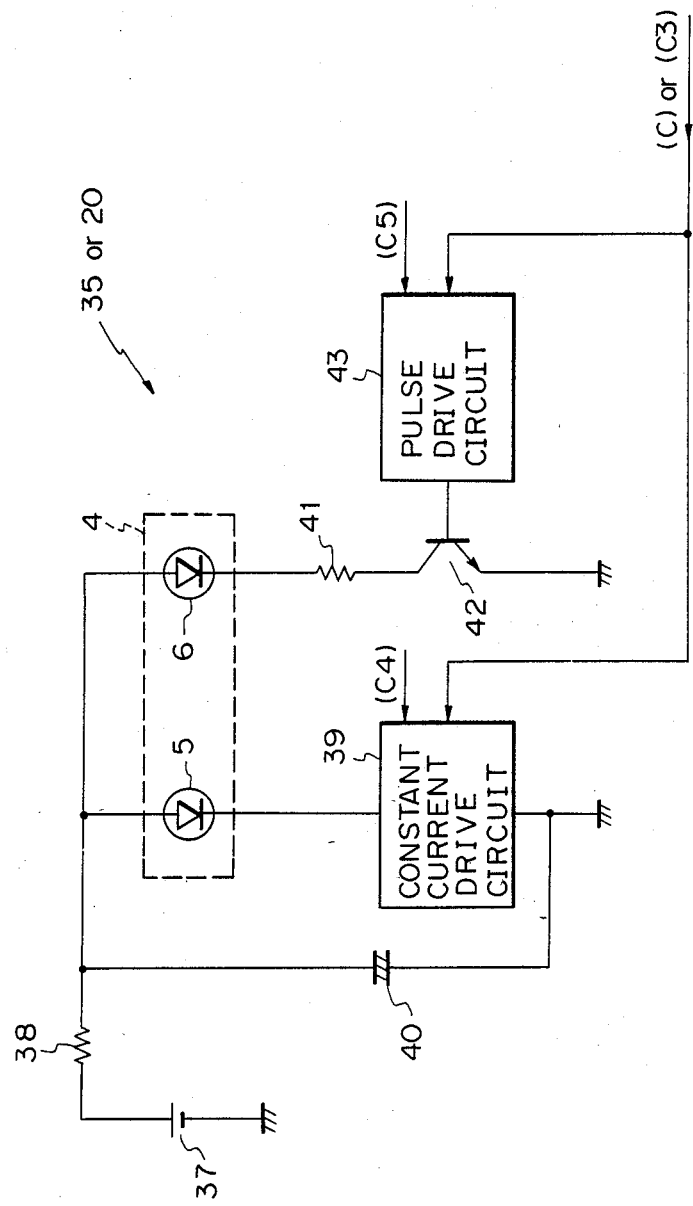
FIG. 12 is a block circuit diagram of the drive means of FIG. 10 relatively in detail.

FIG. 12 is a block diagram of the drive circuit 35 illustratd in detail.

The drive circuit of FIG. 12 comprises: a power source 37 the negative pole of which is grounded; a ballast resistance 38 an end of which is connected to the positive pole of the power source 37; a center chip 5 and a side chip 6 each chip being connected to the other end of the ballast resistance 38; a suction type constant current drive circuit 39 connected between the cathode side of the center chip 5 and the ground to drive center chip 5 by a constant current in response to a light emitting signal (C) transmitted through an input terminal thereof; a ballast capacitor 40 an end of which is connected to the anode side of the center chip 5, the other end being connected to the ground; a limiting resistance 41 an end of which is connected to the cathode side of the side chip 6; a transistor 42, the collector thereof being connected to the other end of the limiting resistance 41 and the emitter thereof being connected to the ground; and a pulse drive circuit 43 having an input through which the light emitting signal (C) is transmitted thereto and an output connected to the base of the transistor 42 to drive the side chip 6 by a pulse signal.

Note that in this second embodiment illustrated in FIG. 12, the execution signals (C4) and (C5), the drive circuit 20 and the switch signal (C3) can be deleted.

Figure 13:
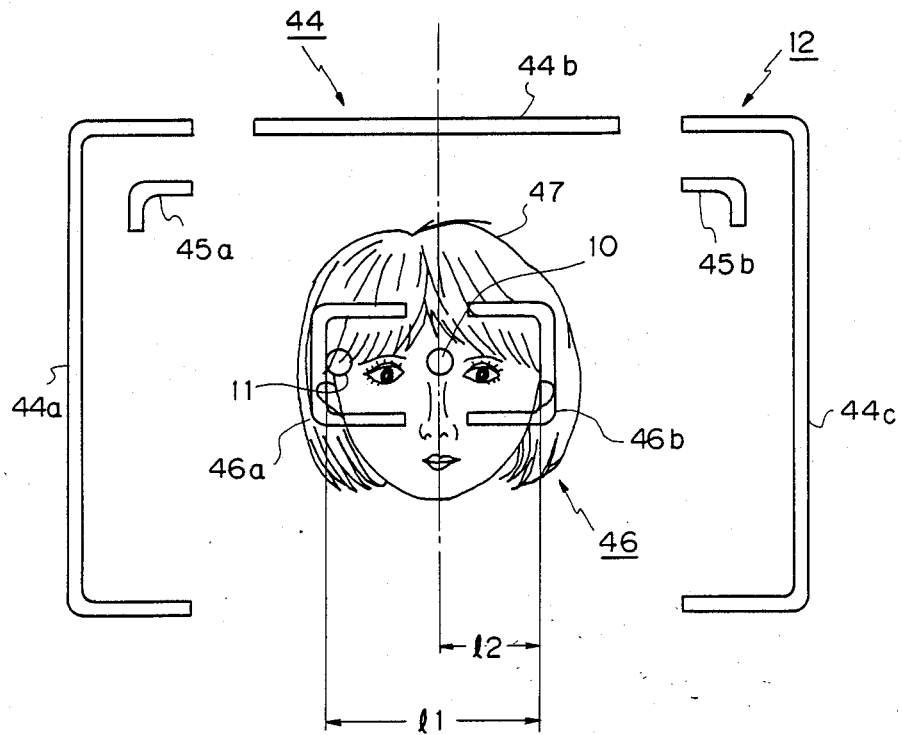
FIG. 13 is an explanatory view for explaining relationship between the area mark in the finder display and the object irradiated by a detection light in accordance with a still another embodiment of the present invention.

A third embodiment of the present invention is described below with reference to FIG. 13 which partly illustrates the third embodiment. The other parts of the third embodiment other than that illustrated in FIG. 13 are the same as those of FIGS. 6 and 7. The conditions on which the third embodiment is constructed is slightly different from that of the first embodiment. The different points are described first with reference to FIG. 6.

In FIG. 6, when the drawing is used to refer to the third embodiment, the object 9 is placed at a short distance position of distance L (mm) away from the camera. Also, the relation between the above mentioned lengths x and f is represented by the following equation (1).

$$0 < (x/f) < 0.1 \tag{1}$$

Also, the center light beam 10 and the side light beam 11 are reflected by the object 9 at points thereon separated away from each other by distance y (mm). In other words, the optical axis of the center light beam 10 and that of the side light beam 11 do not coincide with each other, which causes the separation of the reflection points of the two beams on the object 9 at the distance of L from the camera.

FIG. 13 is a front view of the finder 12 representing the relation between the area mark, the center light beam 10, the side light beam 11 and the object.

In FIG. 13, there are depicted: a field mark 44 which appears on the display of the finder 12 and comprises optical image frames 44a, 44b and 44c arranged in a rectangular shape; position marks 45a and 45b for compensating for parallax; a distance measurement area mark 46 comprising a pair of U-shape optical image frame 46a and 46b facing with each other and defining a field range wherein the distance to the object can be measured; and an object 47 which is a face of a girl in this example. The reflection points of the center light beam 10 and the side light beam 11 on the object (face) 47 are designated each by one of circles 10 and 11. Reference letter l1 designates an average width of a human face. Reference letter l2 represents a half of l1.

Figure 14:
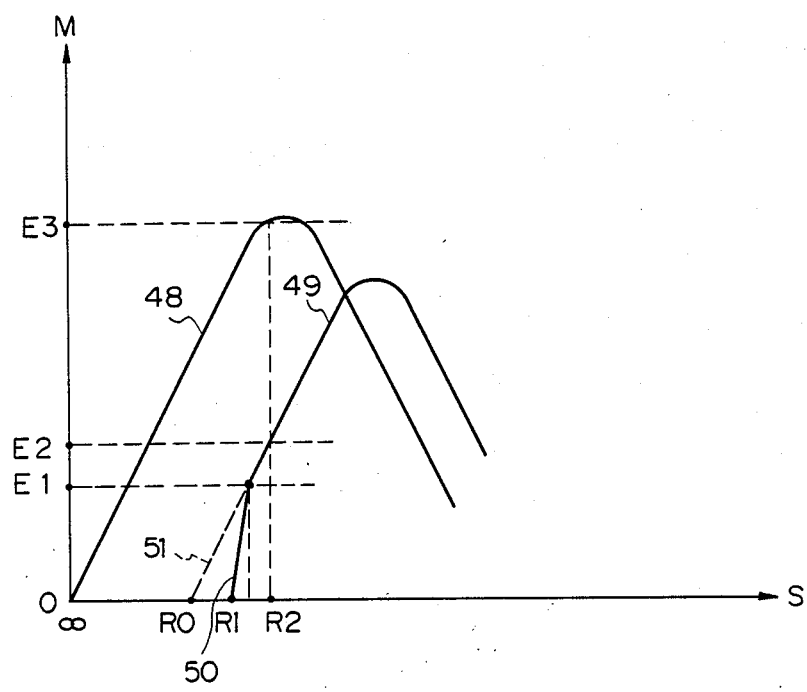
FIG. 14 is a graphical view for showing a distance measuring characteristic of a still another embodiment of the present invention.
Figure 15:
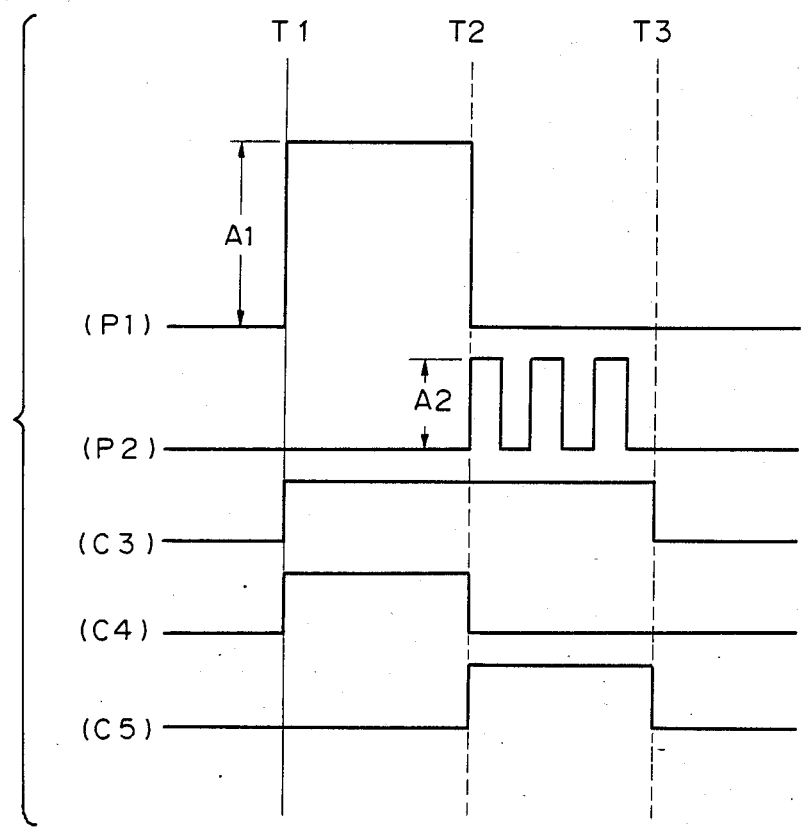
FIG. 15 is a timing chart for showing timing of the drive signal output from the drive means of the embodiment of FIG. 14.

A fourth embodiment of the present invention is partly illustrated in FIGS. 14 and 15. The other parts of this fourth embodiment are the same as those of FIGS. 6 and 12. Note that when FIGS. 6 and 12 are applied to the fourth embodiment, the drive circuit 35 is constructed in a manner that the drive circuit 20 of FIG. 6 receives an execution signal (C5) transmitted from the selection circuit 19 in addition to the execution signal (C4) similarly transmitted from the selection circuit 19 and that each of the constant current drive circuit 39 and the pulse drive circuit 43 receives an execution signal (C4), (C5) each in addition to the switch signal (C3). Also, with respect to the execution signals (C4) and (C5), the signal level 'H' corresponds to an operation state and the signal level 'L' corresponds to a non-operation state, whereas with respect to the switch signal (C3), the signal level 'H' corresponds to a light emission state and the signal level 'L' corresponds to a non-emission state. Also, note that the reference letter (C) and the numeral 20 for designating the drive circuit can be deleted.

FIG. 14 is a graphical view representing the distance measuring characteristic of the above mentioned fourth embodiment. The graph of FIG. 14 partly corresponds to that of the first embodiment of FIG. 7. Therefore, the corresponding part is designated by the same reference letter or numeral as that of FIG. 7.

In FIG. 14, the ordinate M represents the calculation output corresponding to the distance measurement information data (D2) which is output from the distance calculation circuit 13 and the abscissa S represents the reciprocal of the distance to the object for the sake of easy representation of the characteristic in the graph. Therefore, with respect to the abscissa S, the intersection point with the ordinate M represents the distance at the infinity ∞ and the distance decreases toward the direction of the arrow of the abscissa S. In FIG. 14, lines 48 and 49 represent characteristic curves of the fourth embodiment corresponding to the lines 21 and 22 of FIG. 7, respectively. Numeral 50 designates an actual foot line of the characteristic line 49. Numeral 51 designates a theoretical foot line of the characteristic line 49. E3 designates a value near the peak of the calculation output (M) of the characteristic line 48. The peak value of the characteristic line 49 is lower than that of the characteristic line 48 and the line 49 is shifted toward the short distance side (rightward) of the line 48.

FIG. 15 is a timing chart of signals (P1), (P2), (C3), (C4) and (C5). T1 is a timing point where the center chip 5 starts to be driven. T2 is a timing point where the operation of the center chip 5 ends and the side chip 6 starts to be driven instead. T3 is a timing point where the operation of the side chip 6 ends. A1 represents the amplitude of the current wave of the drive signal (P1) and A2 represents the amplitude of the current wave of the drive signal (P2). A1 is larger than A2.

Function and movement of the first embodiment having the above mentioned structure is described below.

Movement of the whole function from start to end is described first. The control means 18 drives the selection circuit 19 to select the center chip 5 in accordance with the selection signal (C2). Also, the control means 18 drives the data change circuit 14 to output the signal (D3). In this condition, when the control means 18 outputs the switch signal (C3), the drive circuit 20 which receives the execution signal (C4) and the switch signal (C3) outputs the drive signal (P1) to drive the center chip 5 to emit the light so that the center light beam 10 is radiated from the center chip. Then the reflection light 10a irradiates the light receiving optical sensor 8 so that the incident reflection light is imaged at a position of distance d1 from the center of the opitcal sensor 8. The optical sensor 8 transmits an output signal (D1) corresponding to the incident position of the reflection light on the optical sensor 8 to the distance calculation circuit 13. The distance calculation circuit 13 executes the predetermined calculation in accordance with the output signal (D1) transmitted from the optical sensor 8 and outputs a distance measurement data (D2). This distance measurement data (D2) is transmitted to the memory circuit 15 through the data change circuit 14 and memorized in the memory circuit 15.

Ater that, the control means 18 changes the data change signal (C1) and the selection signal (C2) so as to drive the side chip 6 to emit the light so that the side light beam 11 is radiated from the side chip 6. The side light beam 11 is reflected by the object 9. The reflection light from the object irradiates the optical sensor 8 and forms an image thereof at a position of distance d2 form the center of the optical sensor. The optical sensor 8 transmits an output data (D2) corresponding to the distance d2 mentioned above to the data change circuit 14. The data change circuit 14 transmits the data signal (D2) to the memory circuit 16 as an output (D4) which is memorized in the memory circuit 16.

Then, function of the data discrimination means 17 is described hereinafter with mainly reference to FIG. 7. First, the distance measurement data (D6) transmitted from the memory circuit 16 is compared with the reference value K. If the distance measurement data (D6) is larger than the reference value K, the distance measurement data (D6) which corresponds to the characteristic line 22 is determined to be an effective data. On the other hand, if the distance measurement data (D6) is smaller than the reference value K, the distance measurement data (D5) which is transmitted from the memory circuit 15 and corresponds to the characteristic line 21 is determined to be an effective data.

The function of the data discrimination means is further described in detail below. First, the case wherein the distance measurement data (D6) is smaller than the reference value K is explained. The object is assumed to be positioned at R1 which is in the infinity side of Rk1. In this case, the calculation output M for the center chip 5 is represented as M=a3 which corresponds to two object distances R1 and R2. It is impossible to directly determine which the genuine value of the distance to the object is in this situation. However, the other calculation output M for the side chip 6 is represented as M=a1 which corresponds to the object distance R1. That is, R1 corresponds to either of M=a3 and M=a1 in common. Therefore, the distance R1 can be determined to be a genuine value for the distance to the object. In other words, when the distance measurement data (D6) based on the side chip 6 is smaller than the reference value K, the genuine value of distance to the object can be obtained by determining the characteristic line 21 i.e., the distance measurement data (D5) to be effective.

Next, a case wherein the object is positioned at R2 is described below. In this case, the calculation output M for the center chip 5 is represented as M=a3 which corresponds to two object distances R1 and R2 as is the case mentioned above. Therefore, also in this case, it is impossible to directly determine which the genuine value of the distance to the object is. However, in this case, the calculation output M for the side chip 6 is represented as M=a2 which corresponds to the object distance R2. That is, R2 corresponds to either of M=a3 and M=a2 in common. Therefore, the distance R2 can be determined to be a genuine value for the distance to the object. In other words, in this case, a2 is larger than the reference value K, therefore, the genuine value of distance to the object can be obtained by determining the characteristic line 22 i.e., the distance measurement data (D6) based on the side chip 6 to be effective.

Next, a case wherein the object is positioned at R3 which is within the range BK corresponding to the short distance alarm range AK is described below. The calculation output M based on the center chip 5 is represented as M=b2 which corresponds to two object distances R3 and R4. Therefore, it is impossible to directly determine which the genuine value of the distance to the object is in this situation. However in this case, the calculation output M based on the side chip 6 is represented as M=b1 which corresponds to the object distance R3. That is, R3 corresponds to either of M=b2 and M=b1 in common. Therefore, the distance R3 can be determined to be a genuine value for the distance to the object. In other words, in this case wherein b1 is larger than the reference value K, the genuine value of distance to the object can be obtained by determining the characteristic line 22 i.e., the distance measurement data (D6) based on the side chip 6 to be effective.

With regard to the object distance R4, the genuine value can be obtained in the same manner as in the case of the distance R2.

Principle that the area mark 30 of FIG. 9 is shortened is described hereinafter with refernece to FIGS. 8 and 9.

in FIG. 8, the infinity side of the center are G0 for the center chip 5 and the short distance side of the side area for the side chip 6 overlap each other in the area G3. The overlapped area G3 coersponds to the short distance range of the object form R3 (object 25) to R2 (object 26) of the side area for the side chip 6. This short distance range from R3 (object 25) to R2 (object 26) corresponds to the short distance side area G2 of the center area G0 for the center chip 5. Therefore, the short distance side area G2 for the center chip 5 can be deleted since the distance information of the range between R2 and R3 is obtained from the side chip 6. Accordingly, a narrowed effective area G1 without the short distance area G2 is enough for functioning as the center area G0.

The arrangement of the area mark is further described hereinafter with reference to FIG. 9 in comparison to that of FIG. 1 mentioned before. The area between the image positions Rm2 and Rm3 of FIG. 1 can be deleted in the arrangement of FIG. 9. Therefore, the optical image frame 82b of FIG. 1 can be shifted to the image position Rm3 as illustrated by 30b in FIG. 9 so that the width of the area mark is reduced from L1 to L2.

Function of the area mark 30 having the reduced size as mentioned above is described below. Referring back to FIG. 8, as mentioned before, the structure is so arranged that the center reflection light 23a of the center light beam 10 reflected by the object 23 positioned at the infinity forms an image thereof in the area mark at the position Rm∞ which coincides with the position Rs3 where the side reflection light 25b of the side light beam 11 reflected by the object 25 positioned at R3 forms an image thereof. Therefore, the object 23 at the infinity and the object 25 at the distance R3 can be seen at the same image position Rm∞ in the area mark 30 of the finder 12. In other words, the image appeared at the position Rm3 formed by the center reflection light 25a and the image appeared at the position Rs3 formed by the side reflection light 25b represent the same object 25. This means that the object can be seen in the area mark 30 without parallax at any position therein, so that it becomes possible to avoid distance measurement errors due to parallax.

The above mentioned first embodiment of the present invention has further advantages as described later. However, the structure of the first embodiment requires selection circuit 19, data change circuit 14, memory circuit 16 in order to emit the light in a predetermined time sequence from the center chip 5 and the side chip 6, which makes the structure complicated and causes to raise the cost thereof when compared to the structure comprising only the center chip 5.

The second embodiment of the present invention was made considering the above points of the first embodiment.

Prior to explaining the function of the second embodiment of the present invention, function of the drive circuit 35 of FIG. 12 is described below. Operation condition is arranged in a manner, for example, that signal level 'H' of the light emitting signal (C) corresponds to a light emission state whereas signal level 'L' thereof corresponds to a non-emission state. When the distance is not to be measured, the light emitting signal (C) is in a state of level 'L'. This light emitting signal (C) is transmitted to the constant current drive circuit 39 which breaks the structure circuit in response to the signal. Therefore, current is not applied to the center chip 5. Also, the pulse drive circuit 43 receives the light emitting signal (C) in the state of level 'L' so that the output of the pulse drive circuit becomes 0 V, which turns the transistor 42 off. Therefore, current is not applied to the side chip 6. Accordingly, neither the center chip 5 nor the side chip 6 emits light. When the light emitting signal (C) is changed to level 'H', the constant current drive circuit 39 operates to apply a constant current to the center chip 5 through the ballast resistance 38 from the power source 37 so that the center chip 5 emits the light. The luminous intensity of the center chip 5 is maximized by setting the constant current drive circuit 39 at the maximum value thereof.

On the other hand, the pulse drive circuit 43 transmits a pulse signal from the output terminal thereof to the transistor 42 so that the transistor 42 repeats to be turned on and off at a predetermined interval. When the transistor is turned on, a current limited by the limiting resistance is applied to the side chip 6. Therefore, the luminous intensity of the side chip 6 is lower than that of the center chip 5 even when the transistor is turned on. When the transistor is turned off, the side chip 6 does not emit the light. Therefore, the average luminous amount of the side chip 6 is far smaller than that of the center chip 5.

The ballast resistance 38 and the ballast capacitor 40 present the voltage of the power source 37 from being fluctuated in response to the on and off movement of the transistor 42.

The whole function of the second embodiment of the present invention is described hereinafter with reference to FIG. 6. The control means 34 arranges the light emitting signal (C) to be in a state of level 'H' so as to drive the drive circuit 35 so that the center chip 5 and the side chip 6 simultaneously emit the light. The light from the center chip 5 and the light from the side chip 6 are collimated through the light emitting side lens 3 and emit therefrom as the center light beam 10 and the side light beam 11, respectively, toward the object. The center light beam 10 and the side light beam 11 are reflected by the object 9 at points separated away form each other by a length y on the object. The reflection light 10a of the center light beam 10 and the reflection light 11a of the side light beam 11 are converged through the light receiving side lens 7 and irradiate the optical sensor 8 at positions of distance d1 and distance d2 away from the center of the optical sensor 8, respectively, so that an image of the reflection light 10a and an image of the reflection light 11a are formed at the positions on the optical sensor. Therefore, the position signal (D1) output from the optical sensor 8 is a compound signal in accordance with the distance of the image position from the center of the optical sensor and the luminous intensity of the incident reflection light onto the optical sensor 8. Usually the information data of the distance and the information data of the luminous intensity are added to form the compound signal (D1). The distance calculation circuit 31 receives the compound position signal (D1) and outputs a distance measurement data (M) in response to the compound amount of the position signal (D1). The time period wherein the light emitting element 4 is driven to emit the light i.e., the control means 34 arranges the light emitting signal (C) to be in a state of level 'H' is very short. Therefore, the distance measurement data (M) is memorized in the memory circuit 32 which holds the distance measurement data (M) until another distance measurement data for a next measurement operation is input thereto.

Function of the data discrimination circuit 33 is described below with reference to FIGS. 10 and 11. The data discrimination circuit 33 receives a distance measurement data (Dm) from the memory circuit 32 and compares the data (Dm) with a reference value (a). When the distance measurement data (Dm) is larger than the reference value (a), the data discrimination circuit 33 determines that the distance measurement data (Dm) is within the short distance alarm range W. The determined information is transmitted to the control means 34 which alarms the user by an appropriate means such as an alarm display. By the operation mentioned above, the user is noticed that the distance measuring device is in the state of inoperable condition since the distance to the object is too short, thereby measurement errors can be avoided.

The above mentioned first embodiment and the second embodiment are explained under the condition that the side light beam 11 can be reflected by the object 9. However, if the object 9 is smaller (shorter) by far than the length y, a problem arises as mentioned below. For example, if the object is as short as half of the object 9 illustrated in the drawings so that there is no object material in the left half of the illustrated one, the object 9 can reflect only the center light beam 10 but can not reflect the side light beam 11. Therefore, the side light beam 11 passes the object 9 without being reflected thereupon and reaches another object far beyond the object 9. The side light beam 11 is reflected by this another object and the reflection light thereof is detected by the distance measuring device, which causes measurement errors. The third embodiment of the present invention was made considering the above mentioned problem.

Function and movement of the embodiment of FIG. 8 is described below. The function of the third embodiment in accordance with FIGS. 6 and 7 is the same as that of the first embodiment mentioned before, therefore the explanation thereof is deleted. First, the equation (1) which represents the main principle of the third embodiment is explained.

From the dimensional arrangement illustrated in FIG. 6, the following equation is obtained.

$$y = (L/f) \cdot x \qquad (2)$$

In general, the longest distance covered by the macro operation (proximity photographing) is 500 mm. Therefore, the distance L can be assumed as L=600 mm with a margin. Also, the width of the face 47 is assumed as l1=120 mm. On this condition, when the center light beam 10 irradiates the center of the face 47 as illustrated in FIG. 13, in order to irradiate the face with the side light beam 11, it is necessary that the length y of FIG. 6 is smaller than l2=60 which is a half of the width l1 of the face. In other words, the following equation must be satisfied when L=600 mm.

$$0 < y < 60 \qquad (3)$$

The equation (1) mentioned before can be obtained from the equations (2) and (3) as $0 < (x/f) < 0.1$.

Therefore, as long as the dimensional relationship of the optical system satisfies the equation (1), the side light beam 11 irradiates the object (face) 26 as the subject of the picture, thus measurement errors can be avoided.

As mentioned above, the third embodiment of the present invention solves the problem that the side light beam 11 passes the object 9 without irradiating the object due to the size of the object being smaller by far than the length y. However, the structure of the third embodiment limits the positional arrangement of the light emitting side lens 3, center chip 5 and the side chip 6, which reduces the freedom of design. The fourth embodiment of the present invention was made considering the above mentioned point.

Function of the fourth embodiment of the present invention is described hereinafter with reference mainly to FIGS. 6, 12, 14 and 15.

First, function of the drive circuit 20 which constitutes a main portion of the fourth embodiment is described with reference mainly to FIGS. 12 and 15.

When the switch signal (C3) is in a state of level 'L', the constant current drive circuit 39 breaks the system circuit upon receipt of the switch signal (C3) of level 'L', irrespective of the state of level of the execution signal (C4). Therefore, current is not applied to the center chip 5. Also, the voltage of the output terminal of the pulse drive circuit 43 becomes 0 V when the switch signal (C3) of level 'L' is transmitted to the pulse drive circuit 43 so that the base voltage of the transistor 42 becomes 0 V to turn off the transistor 42. Therefore, current is not applied to the side chip 6, either. Accordingly, the center chip 5 and the side chip 6 are maintained to be in a state of non-emission of the light since current is not applied to the light emission element 4.

On the other hand, when the switch signal (C3) and the execution signal (C4) are changed to a state of level 'H' at a timing point T1 as illustrated in FIG. 15, upon receipt of the switch signal and the execution signal, the constant current drive circuit 39 starts to operate so that a constant current is applied to the center chip 5 (actually the constant current is sucked by the drive circuit). The constant current has an amplitude A1 which corresponds to the maximum luminous emission amount of the center chip 5. In such a manner, the current from the power source 37 is introduced to the center chip 5 through the ballast resistance 38 and sucked by the constant current drive circuit 39. The suction amount of current of the constant current drive circuit 39 is controlled so that the center chip 5 is driven to emit the light in accordance with the constant current having an amplitude A1 which corresponds to the maximum luminous emission amount of the center chip 5. The center chip 5 is maintained to emit the light at the maximum luminous intensity thereof until timing point T2. At the timing point T2, the execution signal (C4) is turned to a state of level 'L' so that the constant current drive circuit 39 breaks the system circuit to turn off the center chip 5.

At the timing point T2, the execution signal (C5) rises to level 'H' and the switch signal (C3) is also held to be in the state of level 'H'. The pulse drive circuit 43 receives these signals of level 'H' and starts the operation thereof so that a pulse signal having a predetermined frequency is output therefrom. This pulse signal is introduced to the base of the transistor 42 so that the transistor 42 repeats to be turned on and off in accordance with the pulse signal. Therefore, when the transistor 42 is turned on, a current is applied to the side chip 6 from the power source 37 through the ballast resistance 38 so that the side chip 6 is driven by the current having an amplitude A2 limited by the limiting resistance 41. The transistor 42 continues the on-off movement mentioned above until timing point T3. At this timing point T3, the switch signal (C3) and the execution signal (C5) is changed to level 'L' so that the pulse drive circuit 43 drives the transistor 42 to be turned off, thereby turning the side chip 6 off. As mentioned above, the luminous intensity of the side chip 6 is lower than that of the center chip 5 even when the transistor is turned on, besides the side chip 6 does not emit the light when the transistor is turned off. Therefore, tuhe average luminous intensity of the side chip 6 is smaller by far than that of the center chip 5.

The whole function of the fourth embodiment of the present invention is described briefly below with reference to FIG. 6. The control means 18 drives the selection circuit 19 to operate to rise the execution signal (C4) to level 'H' in accordance with the selection signal (C2). Also, the control means 18 drives the change circuit 14 to operate to output the signal (D3) in accordance with the data change signal (C1). After that, the control means 18 changes the level of the switch signal (C3) to level 'H'. This switch signal (C3) in the state of level 'H' and the execution signal (C4) also in the state of level 'H' are transmitted to the drive circuit 20 so that the drive circuit 20 outputs a drive signal (P1) to drive the center chip 5 to emit the light at the maximum luminous intensity thereof, thereby emitting the center light beam 10 therefrom. The center light beam 10 is reflected by the object. The reflection light 10a of the center light beam 10 is detected by the opitcal sensor 8 and forms an optical image thereof at an incident position which is away from the center of the optical sensor by a distance d1 on the optical sensor 8. The optical sensor 8 outputs a distance signal (D1) which corresponds to the incident position of the reflection light 10a irradiated onto the optical sensor 8. This signal (D1) is transmitted to the distance calculation circuit 13. The distance calculation circuit 13 outputs the distance measurement data (D2). This distance measurement data (D2) is transmitted to the memory circuit 15 through the data change circuit 14 and memorized in the memory circuit 15.

After that, the control means 18 drives the data change circuit 14 to change the output thereof to the output signal (D4). Also, the control means 18 drives the selection circuit 19 through the signal (C2) to operate to change the level of the execution signal (C4) to level 'L' and to change the level of the other execution signal (C5) to level 'H'. Accordingly, the drive circuit 20 outputs the drive signal (P2) so that the side chip 6 emits the light the luminous intensity of which is smaller than that of the center chip 5. Thus, in a manner similar to the center chip 5 mentioned above, the side light beam 11 is emitted from the side chip 6 through the light emitting side lens 3. The side light beam 11 is reflected by the object. The reflection light 11a of the side light beam 11 is detected by the optical sensor 8 and forms an optical image thereof at a position away from the center of the optical sensor 8 by a distance d2. The optical sensor 8 outputs the data signal (D1) which corresponds to the distance d2 of the image position of the incident reflection light 11a onto the optical sensor 8. The distance calculation circuit 13 outputs the distance measurement data (D2) which corresponds to the data signal (D1) output from the optical sensor 8. The distance measurement data (D2) is transmitted to the memory circuit 16 as the distance measurement data (D4) and memorized therein through the data change circuit 14. After that, the data discrimination means determines the distance of the object which is the subject of the picture on the basis of the distance measurement data (D5) from the memory circuit 15 and the distance measurement data (D6) from the memory circuit 16 in accordance with the predetermined function.

The reason why the luminous intensity of the side chip 6 is arranged to be smaller than that of the center chip 5 is explained below.

If the luminous intensity of the side chip 6 is arranged to be equal to that of the side chip 5, the measuring characteristic line 49 illustrated in FIG. 9 has a foot portion represented by the dash line 51 which has the same inclination as the characteristic line 48, which means that the reflection light of the side light beam 11 is attenuated according as the distance to the object is elongated with the same decrement ratio as the reflection light of the center light beam 10. Therefore, there is possibility of measurement error mentioned before when the size of the object 9 is smaller than the length y so that the side light beam 11 does not irradiate the object. There can be possibility of such a measurement error in the distance range between R0 and R2 when the characteristic line is represented by the dash line 51.

On the other hand, by reducing the luminous intensity of the side chip 6 in comparison to the center chip 5, the foot portion of the distance measuring characteristic line 49 changes to the solid line 50, which means that the decrement ratio of the reflection light of the side light beam 11 increases when the distance calculation output M is below E1 which corresponds to the distance around the boundary between the short distance side and the long distance side. Therefore, as can be seen from the graph, the calculation output M becomes zero at the position of distance R1 so that the distance measurement operation can not be carried out. This means that there is no possibility of measurement errors in the distance range between R0 and R1 which range is included within the distance range betwene R0 and R2 in which the measurement error arises when the luminous intensity of the side chip 6 is the same as that of the center chip 5.

As mentioned above, in accordance with the first embodiment of the present invention, the distance measuring device is arranged in a manner that the center chip 5 and the side chip 6 are driven to emit the light in sequence so that the distance measurement data in response to the light of the center chip 5 and the light of the side chip 6 are memorized in the memory circuits 15 and 16, respectively, through the data change circuit 14, and that when the distance measurement data (D6) in response to the side chip 6 is smaller than the predetermined refernce value K, the distance measurement data in response to the center chip 5 is determined to be effective, whereas when the distance measurement data (D6) is larger than the reference value K, the distance measurement data (D6) is determined to be effective. With this arrangement, it becomes possible to reduce the size of the area mark 30 in the finder 12 from L2 of the conventional structure to L1 of the embodiment of the present invention. Therefore, the first embodiment of the present invention has an advantage that it becomes possible to measure the distance to the object positioned in the short distance alarm range BK, which has not been achieved by the conventional distance measuring device. Also, the object distance information R1 and R2 corresponding to the distances to the object Ra1 and Rb1, respectively, are automatically discriminated by the data discrimination circuit 17 without depending on the sense of distance of the user. Therefore, the user can concentrate his or her mind only on the composition of the picture, which upgrades the feeling of manipulation of the device. This brings another advantage that it becomes possible to avoid the measurement error due to a miss discrimination of the distances in accordance with the sense of distance of the user.

Also, in accordance with the second embodiment of the present invention, the distance measuring device is arranged in a manner that the side chip 6 is disposed adjacent to the center chip 5 at a position opposite to the light receiving means 2 with respect to the center chip 5, that the center chip 5 and the side chip 6 are driven to simultaneously emit the center light beam 10 and the side light beam 11, respectively, that the reflection light 10a of the center light beam 10 and the reflection light 11a of the side light beam 11, each reflected by the object 9 are detected by the optical sensor 8 and form optical images thereof at positions away from the center of the optical sensor 8 by the distances d1 and d2, respectively, and that the distance calculation circuit 31 outputs the distance measurement data (M) corresponding to the compounded position signal (D1) formed from the combination of the distance data of d1 and d2. Therefore, the peak of the measuring characteristic line 36 of FIG. 11 becomes to be flatted so that it becomes possible to widen the short distance alarm zone W.

Also, in accordance with the arrangement of the second embodiment of the present invention, the data discrimination circuit 33 receives the distance measurement data (Dm) which corresponds to the compounded signal (D1) through the memory circuit 32 and compares the distance measurement data with the reference value (a). When the distance measurement data (Dm) is larger than the reference value (a), the data discrimination circuit 33 determines that the data (Dm) is within the short distance alarm zone W and alarms the user. Therefore, it becomes possible to accurately measure the distance to the object which is positioned within the range where the user can not discriminate the distance by the human sense of distance.

With the above mentioned arrangement of the second embodiment of the present invention, the measuring characteristic line 36 in the form of a single graph has the same effect as the two measuring characteristic lines 21 and 22 illustrated in FIG. 7 of the first embodiment of the present invention. In other words, it becomes possible to delete the data change circuit 14, the memory circuit 16 and the selection circuit 19 without adversely affecting the distance measuring function thereof and keeping the measurable range from the infinity to the position R1 and the measurable short distance alarm range from the position R1 to the position R3 of the first embodiment unchanged. Accordingly, it becomes possible to simplify the structure of the distance measuring device, thus reducing the cost for manufacturing the device.

Also, in accordance with the second embodiment of the present invention, the side chip 6 is driven by the pulse drive circuit 43, which makes it possible to reduce the consumption of the electric current from the power source 37 in comparison to the arrangement in which the luminous intensity of the side chip 6 is controlled only by the limiting resistance 41.

Besides, the second embodiment of the present invention has further advantages as described below. When the distance to the object is long and therefore the length y illustrated in FIG. 6 becomes long, if the luminous intensity of the side chip 6 is the same as that of the center chip 5, the side light beam 11 emitted from the side chip 6 passes the object without irradiating the object if the object is small. However, unlike such an arrangement, in accordance with the second embodiment of the present invention, the luminous intensity of the side chip 6 is lower than that of the center chip 5, therefore, the reflection light 11a of the side light beam 11 is attenuated and almost vanished in a long distance, thus the measurement error being avoided. Also, when the distance to the object is short, the peak of the measuring characteristic line 36 is flattened as mentioned above, which makes it possible to widen the distance measurable range in comparison to the conventional arrangement and avoid the measurement errors in the short distance range. In other words, the characteristic line 36 has a peak at the distance R2 and the output M gradually decreases in the long distance side and the short distance side of the peak, which could cause the measurement error since the distance data is similar even if the actual distance is different. With the arrangement of the embodiment of the present invention, it is possible to avoid the measurement error since the short distance alarm range W is fully widened.

Also, in accordance with the third embodiment of the present invention, the distance measuring device is arranged in a manner that the center chip 5 is disposed behind the light emitting side lens 3 at a position length f away from the lens, that the side chip 6 is disposed at a position away from the center chip 5 by a gap length x in a side opposite to the light receiving means 2 with respect to the center chip 5 and that the above mentioned lengths f and x satisfy the following equation.

$$0<(x/f)<0.1$$

With the above mentioned arrangement, it becomes possible to avoid the measurement error caused by that the side light beam 11 does not irradiate the face (object) 26 which is the subject of the picture.

Further, the third embodiment of the present invention is arranged in a manner that the center chip 5 and the side chip 6 are driven to emit the light in sequence, that the distance measurement data (D2) in response to the light from the center chip 5 and the light from the side chip 6 are memorized in the memory circuits 15 and 16, respectively, through the data change circuit 14, that when the distance measurement data (D6) is smaller than the reference value K, the distance measurement data in response to the center chip 5 is determined to be effective, whereas when the distance measurement data (D6) is larger than the refernece value K, the distance measurement data (D6) is determined to be effective and that the long distance is measured mainly with the use of the center chip 5 whereas the short distance is measured mainly with the use of the side chip 6. With such an arrangement, it becomes possible to measure the distance within the short distance range BK which is unmeasurable in accordance with the conventional arrangement without adversely affecting the measurement function of the distance in the long distance range. Therefore, it becomes possible to apply the distance measuring device to the camera which is provided with a lens system for macro operation.

Also, the third embodiment has a further advantage that the whole of the left half (FIG. 6) of the light receiving area of the optical sensor 8 comprising the PSD is effectively used as a detection means for detecting the reflection light since the short distance alarm area can be deleted.

In accordance with the fourth embodiment of the present invention, the distance measuring device is arranged in a manner that the side chip 6 is disposed adjacent to the center chip 5 in the opposite side of the light receiving means 2 with respect to the center chip 5 and that the luminous intensity of the side chip 6 is lower than that of the center chip 5. Therefore, the side light beam 11 is greatly diminished when the distance to the object is positioned in the range from the relatively short distance range to the long distance range so that the reflection light 11a reflected from the object at a distance of R0 to R1 is almost vanished, which makes it possible decrease the area wherein the measurement error may occur due to that the side light beam 11 does not irradiate the object of small size since the range from the distance R0 to the distance R1 can be neglected.

Also, the fourth embodiment of the present invention has a further advantage that the consumption of the power from the power source 37 is reduced so that the power source 37 is effectively used since the luminous amount of the side chip 6 is controlled by a pulse signal instead of being controlled only by the limiting resistance 41.

Besides, the distance measuring device of the fourth embodiment of the present invention comprises no movable member which is driven to mechanically move, which heightens the reliability of the device and reduces the manufacturing cost thereof.

The present invention is not limited to the above mentioned embodiments but can be modified to various variants within the scope of the invention.

For example, in the explanation of the first embodiment mentioned above, the side chip 6 is driven to emit the light after the center chip 5 is driven to emit the light. However, the side chip 6 may be driven first and if the distance measurement data (D6) in response to the light emission from the side chip 6 is larger than the reference value K, it is possible to skip to drive the center chip 5 to emit the light and delete the distance measuring operation by the center chip 5. With this manner, it becomes possible to shorten the total function time for calculating the distance by the distance calculation circuit 13.

Also, with respect to the second embodiment of the present invention mentioned before, the light emitting signal (C) is arranged in a manner that the signal level 'H' corresponds to the light emitting state and the signal level 'L' corresponds to the non-emission state. However, the correspondence of the signal level of the light emitting signal (C) to the operation state is not limited to the above mentioned arrangement but may be arranged in a manner vice versa.

Also, the light emitting element 4 is not limited to the two-element LED mentioned before, but may comprise two individual LEDs if the space allows. Otherwise, another appropriate light emitting means may be adopted instead of the LEDs.

Also, in the third embodiment of the present invention as well as the first embodiment thereof, the side chip 6 is driven to emit the light after the center chip 5 is driven to emit the light. However, the side chip 6 may be driven first and if the distance measurement data (D6) in response to the light emission from the side chip 6 is larger than the refernece value K, it is possible to skip to drive the center chip 5 to emit the light and delete the distance measuring operation by the center chip 5. With this manner, it becomes possible to shorten the total function time for calculating the distance by the distance calculation circuit 13.

Also, the longest distance side of the measurement range for macro operation is not limited to L=600 mm. The length L may be changed to around 500 mm considering the arrangement of the lenses of the camera.

Also, in the fourth embodiment of the present invention as well as the second embodiment thereof, the light emitting signal (C) is arranged in a manner that the signal level 'H' corresponds to the light emitting state and the signal level 'L' corresponds to the non-emission state. However, the correspondence of the signal level of the light emitting signal (C) to the operation state is not limited to the above mentioned arrangement but may be arranged in a manner vice versa.

Also, the light emitting element 4 is not limited to the two-element LED mentioned before, but may comprise two individual LEDs if the space allows. Otherwise, another appropriate light emitting means may be adopted instead of the LEDs.

Also, the execution signals (C4) and (C5) may be arranged in a manner that the signal level 'H' corresponds to the non-emission state and the signal level 'L' corresponds to the light emission state instead of the arrangement mentioned before. Further, only one of the execution signals (C4) and (C5) may be arranged in reverse with regard to the correspondence of the signal level to the operation state of the light emitting element.

Many widely different embodiments of the present invention may be constructed without departing from the spirit and scope of the present invention. It should be understood that the present invention is not limited to the specific embodiments described in the specification, except as defined in the appended claims.

What is claimed is:

1. A distance measuring device for an automatic focusing camera which is automatically focused on an object in accordance with information data of distance to the object from the camera which information data is obtained by irradiating a light emitted from a ligth emitting element to the object and receiving the light reflected from the object by a ligth receiving means so as to detect an incident point of the reflection light onto the light receiving means, wherein the distance measuring device comprises:

a first light emitting element disposed on an optical axis of a light emitting optical system;

a light receiving means disposed at a position perpendicularly away from the optical axis by a predetermined reference length;

a second light emitting element disposed at a position perpendicularly away from the optical axis on a side opposite to the light receiving means with respect to the first light emitting element;

a light emission control means for controlling sequence of light emission from the first light emitting element and the second light emitting element;

a distance calculation means for calculating the information data of distance on the basis of an output from the light receiving means corresponding to the incident position of the reflection light to the light receiving means;

a first memory means and a second memory means for memorizing a first information data with regard to the first light emitting element and a second information data with regard to the second light emitting element, respectively, calculated by the distance calculation means in the same sequence as the predetermined light emission sequence;

a distance information data discrimination means for discriminating the information data from the first memory means and the second memory means so that, when the second information data is larger than a predetermined reference value, the second information data is determined to be effective, whereas when the second information data is smaller than the reference value, the first information data is determined to be effective; and a finder having a distance measurable area mark disposed at a position perpendicularly away from the optical axis by a predetermined length so as to define a range of field in which the distance to the object can be measured, wherein a first area and a second area are arranged in the finder in which the first area defines a range of measurable distance by using only the first light emitting element from the longest distance to the shortest distance to the object and in which the second area defines a range of measurable distance by using only the second light emitting element from the longest distance to the shortest distance to the object and wherein the longest distance side of the first area and the shortest distance side of the second area are overlapped each other in the finder.

2. A distance measuring device for an automatic focusing camera according to claim 1, wherein each of said first light emitting element and second light emitting element comprises an LED.

3. A distance measuring device for an automatic focusing camera according to claim 1, wherein said light receiving means comprises a PSD (Position Sensitive Device).

4. A distance measuring device for an automatic focusing camera which is automatically focused on an object in accordance with information data of distance to the object from the camera which information data is obtained by irradiating a light emitted from a light emitting element to the object and receiving the light reflected from the object by a light receiving means so as to detect an incident point of the light onto the light receiving means and which camera alarms when the object is positioned within a short distance alarm range in which the object can not reliably be focused in accordance with the information data of distance to the object, wherein the distance measuring device comprises:

a first light emitting element disposed on an optical axis of a light emitting optical system;

a light receiving means disposed at a position perpendicularly away from the optical axis by a predetermined reference length;

a second light emitting element disposed at a position perpendicularly away from the optical axis on a side opposite to the light receiving means with respect to the first light emitting element;

a light emission control means for controlling the first light emitting element and the second light emitting element so that the first and the second light emitting elements are simultaneously driven to emit light in the state wherein luminous amount of the second light emitting element is smaller than that of the first light emitting element;

a distance calculation means for calculating the information data of distance on the basis of an output from the light receiving means in accordance with an incident position of the reflection light onto the light receiving means; and a distance measurement data discrimination means which compares the distance information data from the distance calculation means with a predetermined reference value and determines whether the distance to the object to be photographed is within the short distance alarm range or not, wherein the short distance alarm range is widened as possible to avoid meaurement errors.

5. A distance measuring device for an automatic focusing camera according to claim 4, wherein a first distance measuring characteristic line on the basis of the reflection light of the first light emitting element and a second distance measuring characteristic line on the basis of the reflection light of the second light emitting element are compounded to form a distance characteristic line having a peak which is flattened in comparison to the first and second characteristic lines to that the short distance alarm zone is widened.

6. A distance measuring device for an automatic focusing camera which is automatically focused on an object in accordance with information data of distance to the object from the camera which information data is obtained by irradiating a light emitted from a light emitting element to the object and receiving the light reflected from the object by a light receiving means so as to detect an incident point of the reflection light onto the light receiving means, wherein the distance measuring device comprises:

a light emitting side lens disposed on an optical axis of a light emitting optical system;

a first light emitting element disposed on the optical axis behind the light emitting side lens;

a light receiving means disposed at a position perpendicularly away from the optical axis by a predetermined reference length; and a second light emitting element disposed at a position perpendicularly away from the optical axis in a side opposite to the light receiving means with respect to the first light emitting element, wherein a condition $0 < (x/f) < 0.1$ is satisfied in which the reference letter f represents a distance (mm) from the light emitting side lens to the first light emitting element and the reference letter x represents a gap distance (mm) between the first light emitting element and the second light emitting element.

7. A distance measuring device for an automatic focusing camera according to claim 6, wherein the automatic focusing camera comprises a lens system which is able to carry out a macro operation.

* * * * *